United States Patent [19]

Schoonmaker

[11] 3,802,085

[45] Apr. 9, 1974

[54] WEB STATUS INSTRUMENTATION ASSEMBLY

[75] Inventor: Edward B. Schoonmaker, East Rochester, N.Y.

[73] Assignee: Eastman Kodak Company, Rochester, N.Y.

[22] Filed: Mar. 29, 1973

[21] Appl. No.: 346,224

[52] U.S. Cl. .............. 33/172 F, 116/67 A, 116/115
[51] Int. Cl. .............................................. G03b 1/64
[58] Field of Search ......... 116/115, 67 A; 33/172 F; 352/170–172

[56] References Cited
UNITED STATES PATENTS
1,535,520   4/1925   Cvitkovich ........................ 33/172 F
FOREIGN PATENTS OR APPLICATIONS
351,482   6/1931   Great Britain ..................... 352/170
431,393   2/1948   Italy ................................. 116/115

*Primary Examiner*—Harry N. Haroian

[57] ABSTRACT

In web transport apparatus having a supported supply roll of web material and means for transporting web material from said roll, there is disclosed a web status instrumentation assembly (1) for continuously indicating the amount of web material remaining on said supply roll, (2) for indicating whether web material is being transported from said supply roll and (3) for indicating when a predetermined length of web has been transported from said roll. The instrumentation assembly includes a pivotally mounted follower arm having an indicator pointer at one end thereof adapted to sweep over a web length indicator scale. A follower roller is eccentrically pivotally mounted at the other end of the follower arm and is spring biased into engagement with the outer convolution of a supported web supply roll. As web material is transported from the supply roll the follower roller rotates eccentrically imparting an oscillatory vibration to the follower arm which is an indication of web transport. When a predetermined length of material has been transported from the supply roll, the follower arm actuates a switch which activates an audible or visual alarm to give an indication of such condition.

4 Claims, 2 Drawing Figures

PATENTED APR 9 1974 3,802,085

WEB STATUS INSTRUMENTATION ASSEMBLY

BACKGROUND OF THE INVENTION

1. Field of the Invention

This invention relates to web transport apparatus and more particularly to web status instrumentation assemblies for web transport apparatus.

2. Description of the Prior Art

Web transport apparatus such as used in photographic and magnetic tape devices are well known in the art. Generally, in such apparatus, a supply roll of web material is transported from the supply roll to a take-up roll along a path past a utilization station. Thus, for example, in photographic devices such as movie cameras or microfilmers the web may be unexposed film which is transported from a film supply roll past an exposure station and as a further example, in magnetic tape devices the web may be magnetic tape transported from a supply roll past magnetic record or play back head. With any such apparatus, it is desirable that the operator or user of the apparatus have an indication of the status of certain web conditions such as the amount of web material remaining on the supply roll, whether or not web material is being transported past the utilization station and when the length of usable web material has been paid out from the supply roll. Prior art instrumentation assemblies for indicating the status of such conditions of the web material have generally been either complex or expensive. It is therefore desirable to provide in web transport apparatus a simple, efficient and economical status instrumentation assembly for indicating to a user of the apparatus the status of such conditions of the web.

SUMMARY OF THE INVENTION

It is therefore an object of the present invention to provide in web transport apparatus web status instrumentation for continuously indicating the amount of web material remaining on a supply roll of web material, for indicating whether web material is being transported from such a supply roll and for indicating when a predetermined length of web has been transported from the roll.

In general, the present invention comprises web status instrumentation means for web transport apparatus including a pivotally mounted follower arm having an eccentrically pivotally mounted follower roller at one end which is adapted to bear against the outermost convolution of a supply roll of web material. The other end of the follower arm has an indicator pointer which is adapted to sweep over a web length indicator scale to give a visual indication of the amount of web material remaining on the supply roll. Transport of web material from the supply roll oscillates the follower arm through the eccentric motion of the follower roller to give a visual indication of web transport. The follower arm is positioned relative to a switch such that when a predetermined length of web material has been transported from the supply roll the switch will be actuated by the follower arm to activate an audible or visual alarm.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawings, in which.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 1:
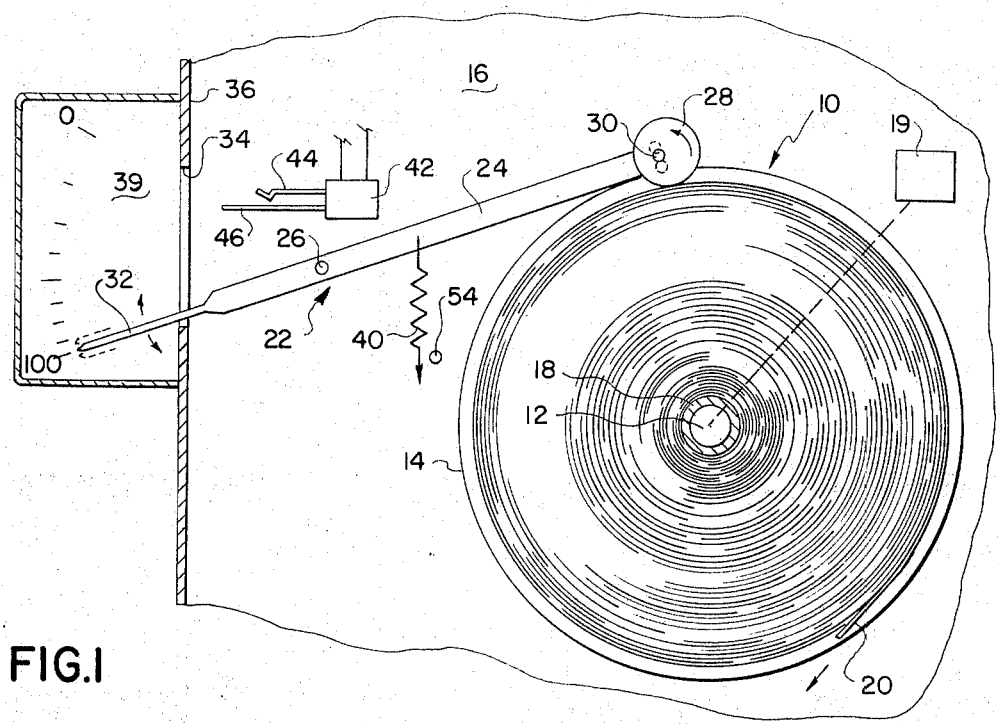
FIG. 1 is a partially sectional diagrammatic view of a preferred embodiment of status instrumentation according to the present invention as shown with a supply spool having a full roll of web material.
Figure 2:
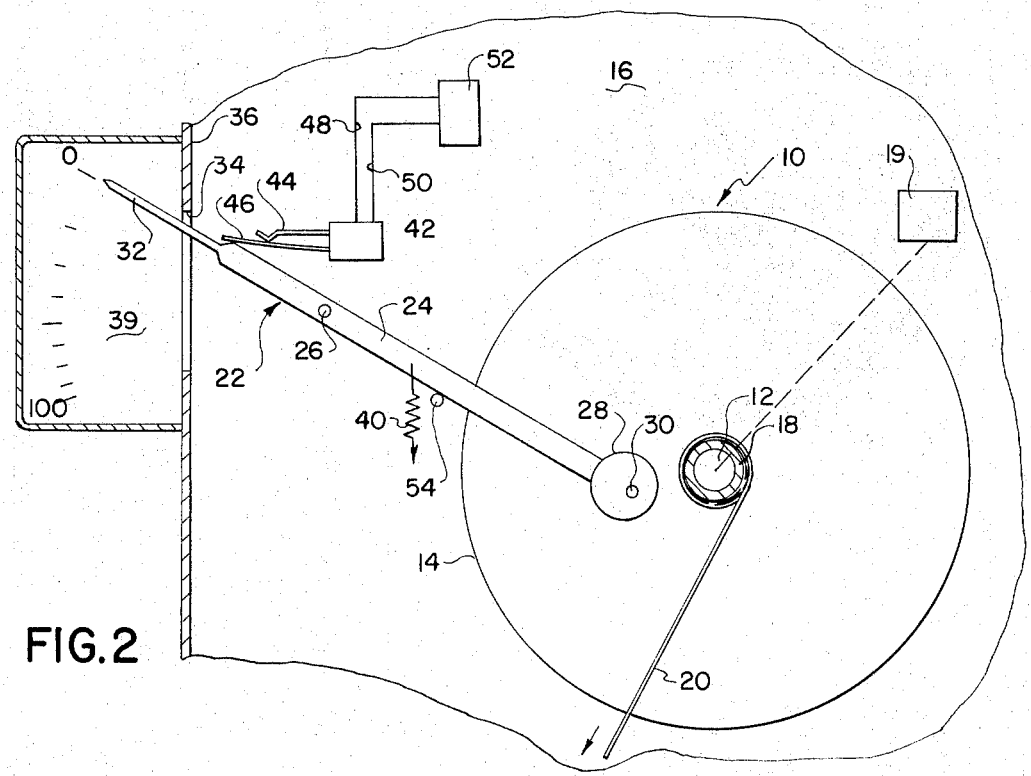
FIG. 2 is the same as FIG. 1 but showing the supply spool substantially empty of web material.

Referring now to FIGS. 1 and 2 there is shown a preferred embodiment of web status instrumentation assembly according to the present invention. As shown, a supply reel 10 including a hub 12 and a flange 14 is rotatably mounted on deck member 16 of web transport apparatus by means of shaft 18. Shaft 18 may be rotatably mounted by suitable bearings (not shown) and may be driven by a motor 19 or other drive means well known in the art. Spooled upon hub 12 is a convoluted roll of web material 20. Web material 20 may, for example be film or magnetic tape which is transported from supply reel 10 past a utilization station to a take-up station. Where web material 20 is microfilm the utilization station may for example be a photographic station in microfilmer apparatus where images from documents or the like are imaged onto unexposed photosensitive microfilm to be recorded thereon. In such apparatus it is desirable that the operator of the microfilmer be provided with indication of the status of certain conditions of the microfilm. Thus, it is desirable that the operator know how much microfilm remains on the supply reel, whether the microfilm is being transported past the exposure station and when the length of usable microfilm has been paid out from the supply reel so that a new roll of unexposed microfilm may be inserted into the microfilmer apparatus.

According to the present invention a web status instrumentation assembly is provided to give indications to the operator of the status of these three conditions of the web. As shown, web status instrumentation assembly 22 includes a follower arm 24 pivotally mounted on deck member 16 by means of pivot 26. An eccentric follower roller 28 is mounted by pin 30 on one end of arm 24 while the other end of arm 24 has mounted thereon an indicator pointer 32 extending through opening 34 in side member 36 mounted on deck member 16. Pointer 32 is adapted to sweep a web supply footage scale 39 mounted by member 36 as web material is transported from reel 10.

Arm 24 is biased by means of spring 40 so that roller 28 is biased into engagement with the outer convolution of web 20.

Mounted on deck 16 adjacent arm 24 is a microswitch 42 having normally open contact members 44 and 46. In FIG. 2, switch 42 is schematically shown connected by means of conductors 48 and 50 to a web out-of-supply alarm 52 which may be either audible or visual and if the latter may be conveniently mounted for observation by an operator of the microfilmer apparatus. A stop 54 is also provided to limit rotation of arm 24.

The operation of web status instrumentation assembly 22 is as follows:

As shown in FIG. 1 a full roll of web material is supported by supply reel 10. Follower roller 28 is urged into engagement with the outer convolution of the supply roll of web 20 by the biasing effect of spring 40 on arm 24. Pointer 32 is shown as pointing to the numeral "100" which may, for example, indicate the length of web material on the supply roll as being 100 feet.

As web material is transported from the supply roll by transport means including motor 19, roller 28 will be driven by the outer convolution of web material. Since roller 28 is eccentrically mounted it will impart an oscillatory vibrating motion to arm 24. Pointer 32 will also vibrate providing a visual indication to the operator that web material is being transported. Since the frequency of vibration of the material being transported will vary with the speed of material transport the rapidity of vibration of pointer 32 will also give an indication to the operator of the speed of transport of the web material.

As web material is paid out from reel 10 roller 28 will track the outer convolution of the web supply roll due to the biasing effect of spring 40 and pointer 32 will sweep scale 39 to give a continuous indication to the operator of the amount of web material remaining on the supply roll.

When a predetermined length of web material has been transported from the supply roll, roller 28 is so positioned with respect to the supply roll that it is no longer in engagement with the outer convolution thereof and arm 24 pushes contact 46 into engagement with contact 44 of microswitch 42. (FIG. 2). This completes a circuit through conductors 48 and 50 to actuate alarm indicator 52 which may for example be an audible alarm such as a bell or a visual alarm such as a light.

Thus, it is seen that there is provided in web transport apparatus, a web status instrumentation assembly which gives an indication of the status of the following conditions of the web (1) the amount of web material remaining on a web supply roll; (2) whether web material is being transported from the supply roll and the speed of such transport and (3) when a predetermined length of web material has been transported from the roll.

The invention has been described in detail with particular reference to preferred embodiments thereof, but it will be understood that variations and modifications can be effected within the spirit and scope of the invention.

I claim:

1. In web transport apparatus having support means for supporting a roll of web material and transport means for transporting web material from a supported roll, a web status instrumentation assembly comprising:

a follower arm;
a follower roller;
first means for mounting said follower roller on said follower arm for eccentric rotation;
second means for mounting said follower arm for movement through an operative path and for urging said follower roller into engagement with an outer convolution of a roll of web material supported by said support means whereby when said web material is transported from said roll said follower roller is eccentrically driven by the movement of said web material and an oscillatory vibrating movement is imparted to said follower arm to thereby give an indication of transport of said web material from said roll; and
web length indicating means associated with said follower arm for indicating the length of web that is remaining on said roll of web material.

2. In web transport apparatus having support means for supporting a roll of web material and transport means for transporting web material from a supported roll, the combination comprising:

a follower arm;
first means for pivotally mounting said follower arm adjacent a supported roll of web material;
a follower roller;
second means for mounting said follower roller for eccentric rotation on said follower arm and for urging said follower roller into engagement with the outer convolution of a supported roll of web material;
indicator means mounted on said follower arm and a web length indication scale associated with said indicator means wherein as web material is transported from said supply roll said indicator means sweeps said web length scale to give an indication of the length of web remaining on said supply roll and wherein transport of web material from said supply roll causes eccentric rotation of said follower roller and consequent oscillatory vibration of said follower arm said oscillatory vibration giving an indication of transport of web material from said supply roll.

3. The combination of claim 2 including switch means and further including out-of-web supply alarm means electrically connected to said switch means, said switch means being located with respect to said follower arm such that when a predetermined length of web material has been transported from said supply roll said arm actuates said switch means to activate said out-of-web supply alarm to give an indication that said predetermined length of web has been transported from said supply roll.

4. In web transport apparatus having means for supporting a roll of web material, means for transporting web material from a supported roll, a pivotally mounted follower arm, a follower roller mounted at one end thereof, means for urging said follower roller into engagement with the outer convolution of a supported roll, an indicator pointer mounted on the other end of said arm, a web length supply scale, said pointer being adapted to sweep said scale to indicate the amount of web material remaining on said roll, the improvement comprising means for mounting said follower roller for eccentric rotation such that as web material is transported from said supply roll said follower roller imparts an oscillatory vibration to said follower arm to give an indication of transport of said web material from said roll.

* * * * *